United States Patent [19]
Han et al.

[11] Patent Number: 5,939,013
[45] Date of Patent: Aug. 17, 1999

[54] PROCESS AND APPARATUS FOR THE PRODUCTION OF HIGH STRENGTH POLYMER COMPOSITE STRUCTURES

[75] Inventors: Kerang Han; Chun Zhang; H. P Ben Wang, all of Tallahassee, Fla.

[73] Assignee: Florida State University, Tallahassee, Fla.

[21] Appl. No.: 08/918,946

[22] Filed: Aug. 25, 1997

[51] Int. Cl.⁶ ................................................. B29C 70/34
[52] U.S. Cl. ..................... 264/510; 264/571; 264/257; 264/258; 264/DIG. 78; 425/112; 425/389
[58] Field of Search ..................... 264/257, 258, 264/510, 511, 571, DIG. 78, 314; 425/112, 389, 405.1, 406

[56] References Cited

U.S. PATENT DOCUMENTS

| | | | |
|---|---|---|---|
| 2,913,036 | 11/1959 | Smith . | |
| 4,902,215 | 2/1990 | Seemann, III | 425/406 |
| 4,942,013 | 7/1990 | Palmer et al. | 264/571 |
| 5,052,906 | 10/1991 | Seemann | 425/112 |
| 5,281,388 | 1/1994 | Palmer et al. | 264/571 |
| 5,316,462 | 5/1994 | Seemann | 425/112 |
| 5,322,665 | 6/1994 | Bernardon et al. | 264/571 |
| 5,439,635 | 8/1995 | Seemann | 264/510 |
| 5,520,529 | 5/1996 | Heckel | 425/218 |
| 5,576,030 | 11/1996 | Hooper | 425/112 |

*Primary Examiner*—Mathieu D. Vargot
*Attorney, Agent, or Firm*—Senniger, Powers, Leavitt & Roedel

[57] ABSTRACT

An apparatus for use in the production of fiber reinforced polymer composite structures includes a mold having a mold surface and a fiber construction on the mold surface including at least one layer of resin absorbing fibrous lay up material. A stiffener on the fiber construction is constructed of a resin absorbing material. A flexible, resin impervious vacuum bag lays over the mold surface and is marginally sealed to the mold surface to define an enclosure for the fiber construction and stiffener. The vacuum bag has a resin inlet to permit introduction of a resin into the enclosure. A vacuum is drawn upon the enclosure to draw the vacuum bag against the fiber construction and stiffener. The stiffener spaces the vacuum bag from the fiber construction when the vacuum bag is drawn against the fiber construction and stiffener to facilitate the distribution of resin uniformly throughout the fiber construction. The stiffener is integrated with the fiber construction upon curing of the resin.

11 Claims, 7 Drawing Sheets

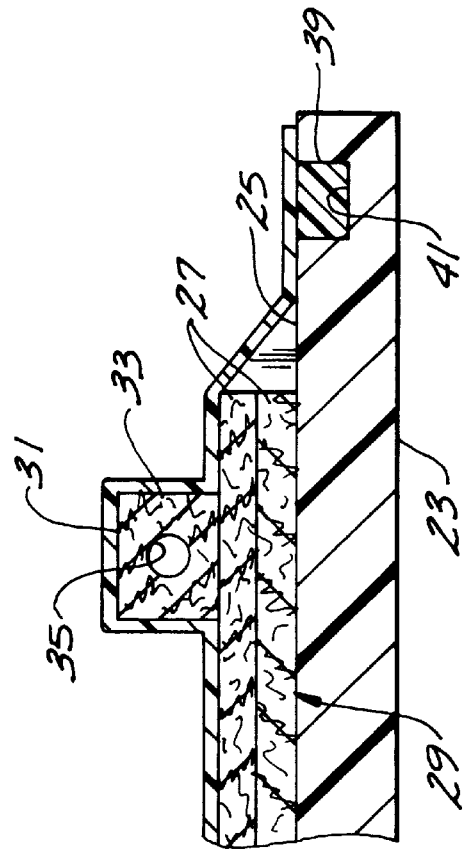
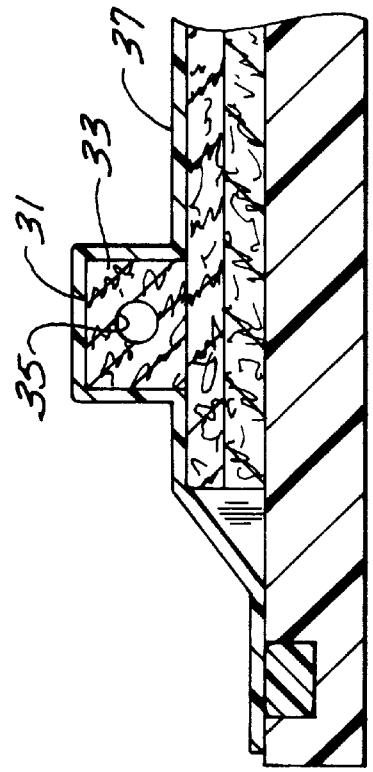
FIG. 3

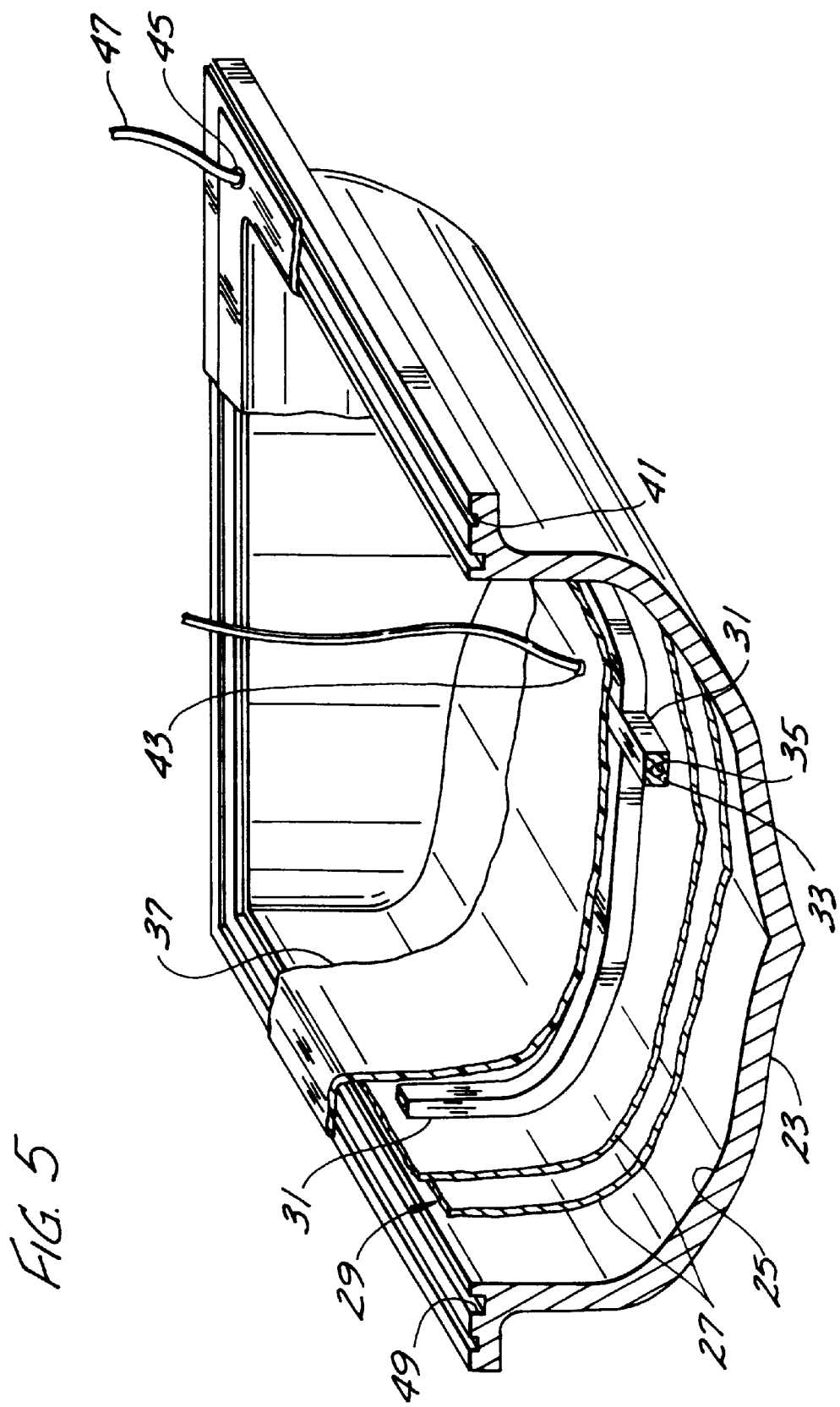

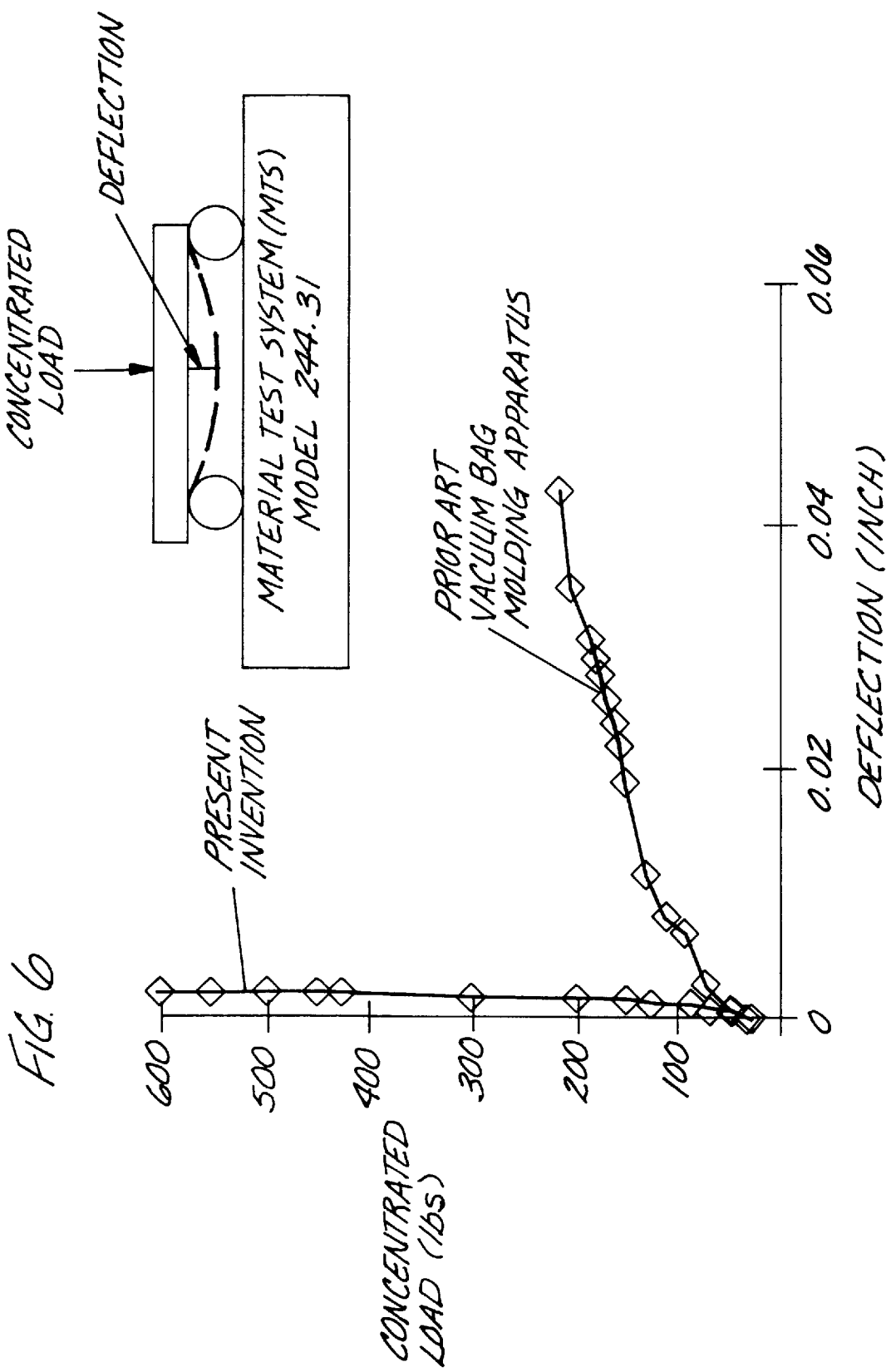

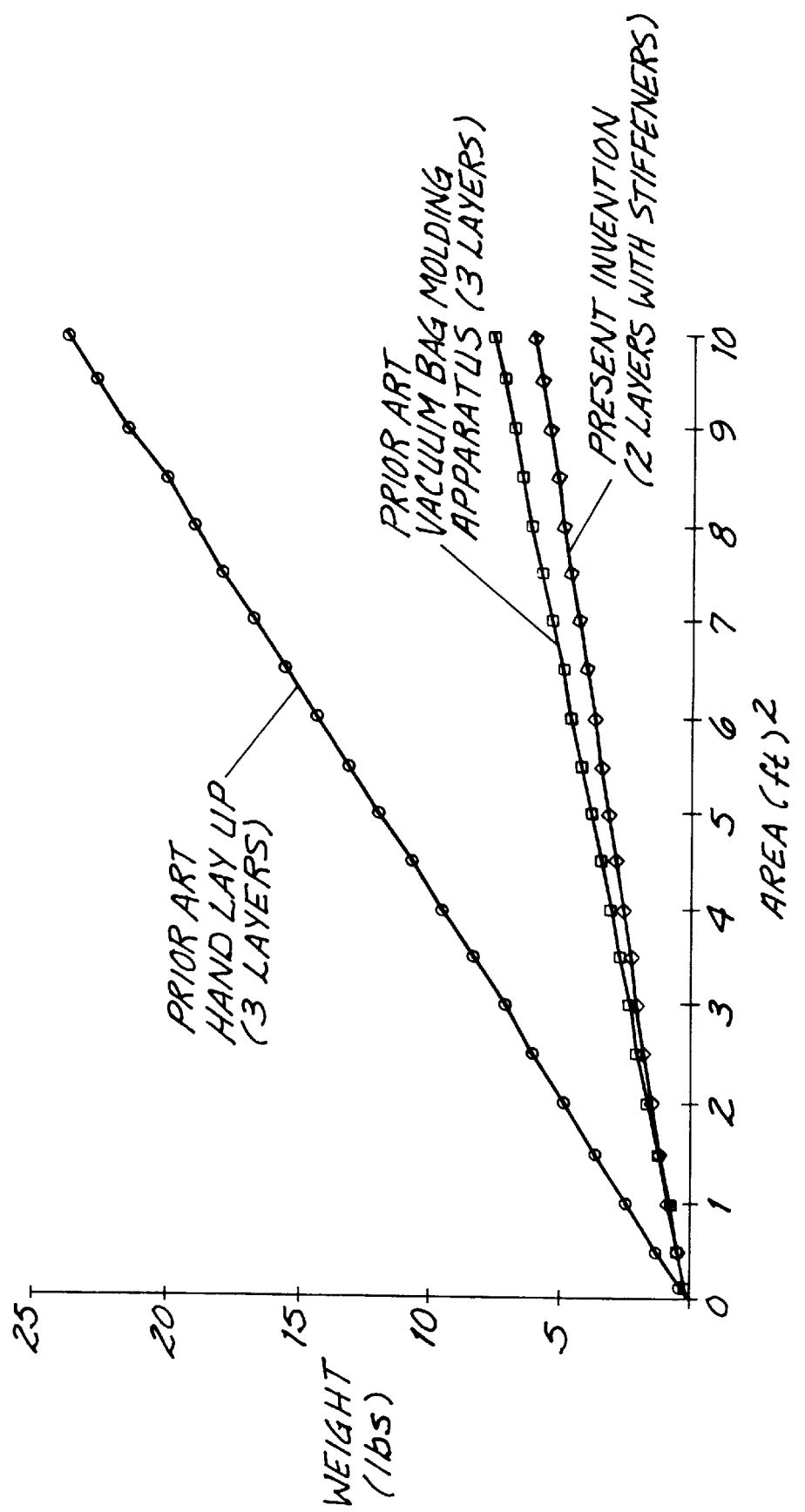

PROCESS AND APPARATUS FOR THE PRODUCTION OF HIGH STRENGTH POLYMER COMPOSITE STRUCTURES

BACKGROUND OF THE INVENTION

The present invention relates generally to a process and apparatus for the fabrication of a fiber reinforced polymer composite structure and, more particularly, to such a process and apparatus for use in fabricating fiber reinforced composite structures using a vacuum bag molding process.

Fiber reinforced polymer composite structures have been manufactured for a number of years and may take many shapes and sizes. The general process for manufacturing these composite structures involves the incorporation of one or more layers of a fibrous reinforcement within a resinous material. This is most commonly achieved through the employment of a dry lay up technique. The dry lay up technique involves applying to a mold one or more layers of a dry fiber reinforcing material and then either spraying, brushing or otherwise applying resin in order to thoroughly impregnate, or "wet", the material with the resin. Once the layers of fiber have been thoroughly wetted, the resin cures or solidifies to form the resulting fiber reinforced polymer composite structure.

Historically, dry lay up has been a labor intensive process because the resin is applied by hand to ensure that all areas of the fibrous reinforcement are thoroughly wetted. Typically, this is done one layer at a time, the fibrous material being placed on the mold and then the resin being applied by hand until several layers are on the mold and ready to cure. In addition to the long process time and high production costs associated with this process, it also has the disadvantage of releasing high quantities of volatile organic compounds, or VOCs, which are emitted from the resin into the air. As regulations on VOC emissions become more and more stringent, the severity of this problem continues to increase.

More recently, vacuum bag molding processes have been developed to overcome some of the disadvantages associated with the dry lay up technique. Vacuum bag molding involves the use of a resin impervious, flexible vacuum bag, liner or sheet marginally sealed over the mold to enclose dry fiber reinforcing material, or "lay up," placed on the mold. A vacuum is applied to the interior of the enclosure to pull the vacuum bag tight against the fiber lay up. A resin is then introduced into the enclosure through a resin inlet in the vacuum bag to wet the dry fiber lay up. Application of the vacuum causes the fibrous materials to pack together and take the shape of the mold. The vacuum also draws the resin into and through the fiber lay up to saturate the lay up. The mold is kept under vacuum while the resin cures or solidifies to form a fiber reinforced composite structure having the shape of the surface of the mold.

Although the vacuum bag molding process effectively reduces the amount of labor required, as well as the quantity of VOCs emitted by trapping them within the sealed enclosure, it also has a number of disadvantages. For example, the tight packing of the layers of dry fiber caused by the vacuum bag being collapsed against the fiber makes it difficult for the resin to diffuse through the fiber material and to flow to the outer margins of the mold. This can result in non-uniform distribution of the resin throughout the fibrous lay up, compromising the structural integrity of the composite structure. To reduce the risk of non-uniform distribution, an operator must assist the flow of resin through the fiber layers using a squeegee, roller, or some other suitable device on the outside of the vacuum bag to force the resin into areas which might not otherwise be reached, increasing the amount of labor, time and expense associated with the molding process.

Use of a distribution medium has been suggested to facilitate the uniform distribution of resin over the fiber material in a vacuum bag molding process, thus ensuring thorough wetting of the fiber. For example, U.S. Pat. No. 4,902,215 discloses an apparatus for achieving the uniform distribution of resin whereby a woven mesh made of non-resin absorptive monofilaments is placed on top of the fiber material between it and the flexible bag. This mesh acts to separate the upper surface of the fabric and the lower face of the bag, thus providing passageways through which the resin may freely and uniformly flow through the mold without the need for operator assistance. After the resin cures, the mesh is removed with the aid of a resin permeable peel ply film which has been inserted between the mesh and the fiber layers.

U.S. Pat. No. 5,316,462 discloses an alternative apparatus for uniformly distributing the resin in which channels are present on the side of the flexible vacuum bag facing the fiber material. Upon application of a vacuum and the subsequent collapse of the bag onto the fiber layers, these channels provide passageways through which the resin may freely and uniformly flow through the mold without the need for operator assistance. After the resin cures, the bag is lifted from the mold and away from the composite structure and then cleaned in order to remove solid resin present in the channels of the bag.

While the above approaches attempt to address the problems associated with the need for uniform distribution of resin, both result in the generation of additional solid waste since the resin distribution mesh and vacuum bag must be discarded. Alternatively, if the resin distribution mesh or vacuum bag with channels are to be reused, the mesh and the channels of the vacuum bag must be thoroughly cleaned before they can be used again, resulting in time consuming process delays. In addition, neither of the proposed distribution mediums impart additional strength to the resulting composite structure beyond that accorded by the fiber layers.

U.S. Pat. No. 2,913,036 (Smith) discloses another apparatus for promoting a uniform distribution of resin in which rigid conduits, constructed of metal or a cured fiberglass composite structure, are placed between layers of the dry lay up material. Holes are drilled into the conduits such that resin flows along the conduits and is distributed to the dry lay up material by flowing through the holes in the conduits. Smith also discloses that if the conduits are not to be included in the final composite structure, the conduits may be laid on top of the dry lay up material and broken away from the structure after the resin has cured.

However, the rigid conduits, constructed of metal or cured fiberglass composite structure, do not bond adequately with the dry lay up material upon curing of the resin. Therefore, as described by Smith, to incorporate the conduits into the composite structure for strengthening the structure the conduits must be placed between the layers of dry lay up material. This substantially increases the weight of the composite structure because more layers of dry lay up material are required. For example, in Smith, two layers of material are used beneath the conduits and another two layers overlay the conduits. In comparison, composite structures generally use only two or three layers of lay up material. Use of Smith's apparatus may also result in poor surface quality and part dimension consistency. As the rigid conduits generate a space between the fiber layers, resin rich regions will form in the space, resulting in a non-uniform curing and surface sink, shrinkage and warpage.

SUMMARY OF THE INVENTION

Among the objects of the present invention, therefore, may be noted the provision of an apparatus and process for producing a fiber reinforced polymer composite structure which promotes a uniform distribution of resin; the provision of such an apparatus and process which produces composite structures of increased stiffness or rigidity; the provision of such an apparatus and process which produces composite structures of reduced weight; the provision of such an apparatus and process which reduces the amount of clean up and solid waste upon forming the composite structure; and the provision of such an apparatus and process which is more economical to use in producing composite structures.

In general, an apparatus for use in the production of fiber reinforced polymer composite structures comprises a mold having a mold surface. A fiber construction on the mold surface comprises at least one layer of resin absorbing fibrous lay up material. A stiffener on the fiber construction is constructed of a resin absorbing material. A flexible, resin impervious vacuum bag lays over the mold surface and is marginally sealed to the mold surface to define an enclosure for the fiber construction and stiffener. The vacuum bag has a resin inlet to permit introduction of a resin into the enclosure. Means are provided for drawing a vacuum upon the enclosure to draw the vacuum bag against the fiber construction and stiffener. The stiffener spaces the vacuum bag from the fiber construction when the vacuum bag is drawn against the fiber construction and stiffener to facilitate the distribution of resin uniformly throughout the fiber construction. The stiffener is integrated with the fiber construction upon curing of the resin.

In another embodiment, an apparatus for use in the production of fiber reinforced polymer composite structures, the apparatus comprises a mold having a mold surface and a fiber construction on the mold surface comprising at least one layer of resin absorbing fibrous lay up material. A generally tubular distribution member on the fiber construction has an outer wall and an internal channel extending longitudinally within the outer wall. The internal channel is fully enclosed about its periphery by the outer wall. The outer wall of the distribution member is sufficiently permeable to permit infusion of resin into the channel whereby the resin flows substantially freely through the channel for quick, uniform distribution of the resin to the fiber construction. A flexible, resin impervious vacuum bag lays over the mold surface and is marginally sealed to the mold surface to define an enclosure for the fiber construction and distribution member. The vacuum bag has a resin inlet to permit introduction of a resin into the enclosure. Means are provided for drawing a vacuum upon the enclosure to draw the vacuum bag against the fiber construction. The distribution member spaces the vacuum bag from the fiber construction when the vacuum bag is drawn against the fiber construction and distribution member to facilitate the uniform distribution of resin to the fiber construction.

A process of the present invention for producing a fiber reinforced polymer composite structure generally comprises placing a fiber construction comprising at least one layer of resin absorbing fibrous lay up material on a mold surface. A stiffener constructed of a resin absorbing material is placed on the fiber construction. A flexible, resin impervious vacuum bag is marginally sealed to the mold surface to form an enclosure for the stiffener and the fiber construction. A vacuum is drawn upon the enclosure to draw the vacuum bag generally against the fiber construction and stiffener. Resin is injected into the enclosure through a resin inlet in the vacuum bag to impregnate the stiffener and the fiber construction with resin. The stiffener spaces the vacuum bag from the fiber construction to facilitate the distribution of resin to the fiber construction. The resin is then cured so that the stiffener is integrated with the fiber construction.

BRIEF DESCRIPTION OF THE DRAWINGS

FIG. 3 is a fragmentary section taken in the plane of line 3—3 of FIG. 1;

FIG. 5 is a fragmentary perspective of a molding apparatus of the present invention as used in forming a composite structure for a boat hull;

FIG. 6 is a plot comparing the stiffness of composite structures formed using the apparatus of the present invention to composite structures formed using prior art apparatus; and FIG. 7 is a plot comparing the weight of composite structures formed using the apparatus of the present invention to composite structures formed using prior art apparatus.

Corresponding parts are designated by corresponding numerals throughout the several views of the drawings.

DETAILED DESCRIPTION OF THE PREFERRED EMBODIMENTS

Figure 1:
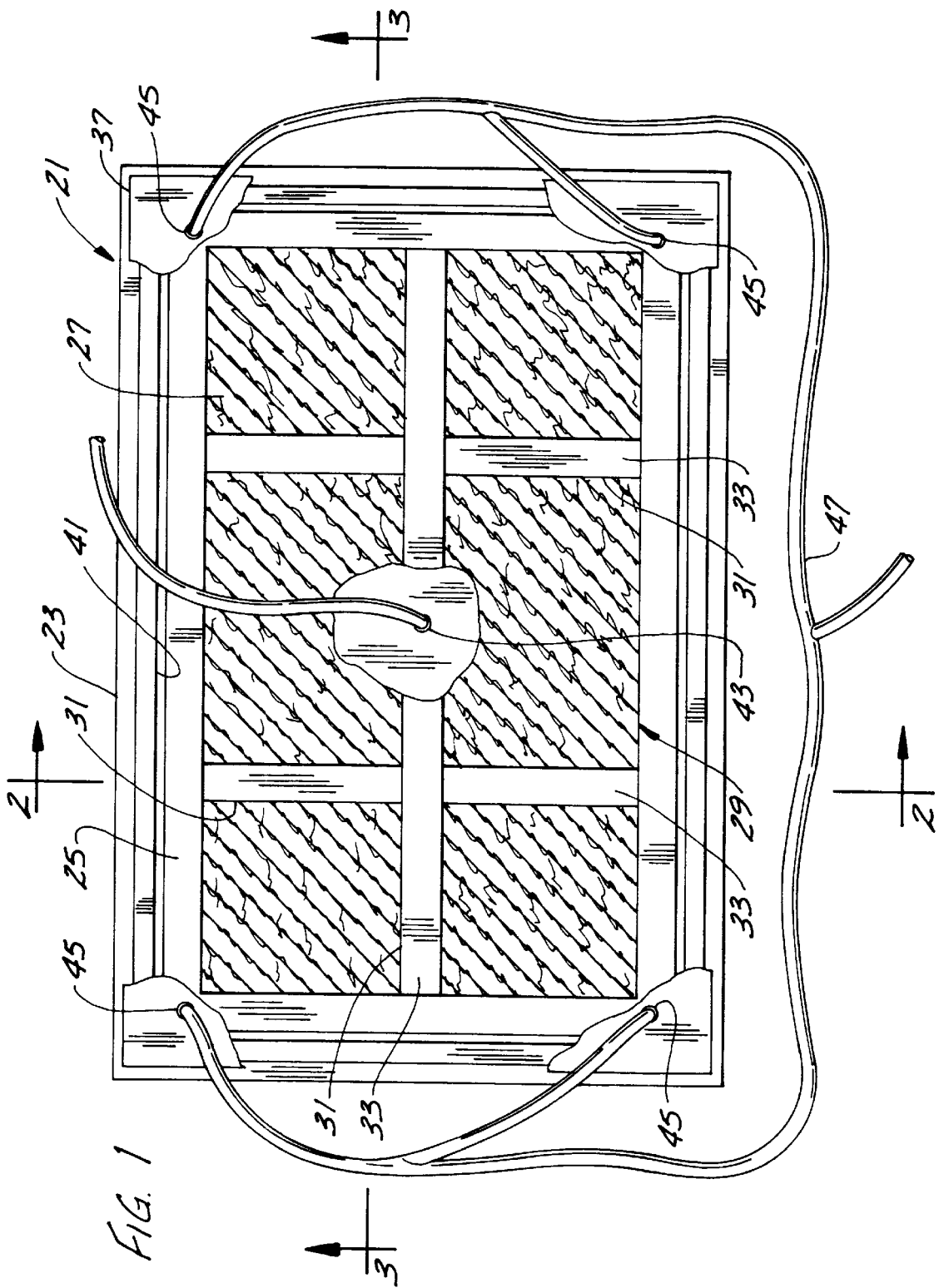
FIG. 1 is a top plan view of a molding apparatus of the present invention with portions of a vacuum bag cut away to reveal internal construction of the apparatus.

Referring now to the drawings, and more particularly to FIG. 1, a molding apparatus of the present invention for use in the production of fiber reinforced polymer composite structures is indicated generally at 21. The apparatus comprises a rigid mold 23 having a mold surface 25 on which the composite structure is formed. For illustration purposes, the mold surface 25 shown in FIGS. 1–3 and described herein is substantially flat. However, it is to be understood that the mold surface 25 may be of any curvature or shape for defining the shape of the composite structure without departing from the scope of this invention. For example, the apparatus and process of the present invention may be used in forming the hull of a boat, as shown in FIG. 5.

Figure 2:
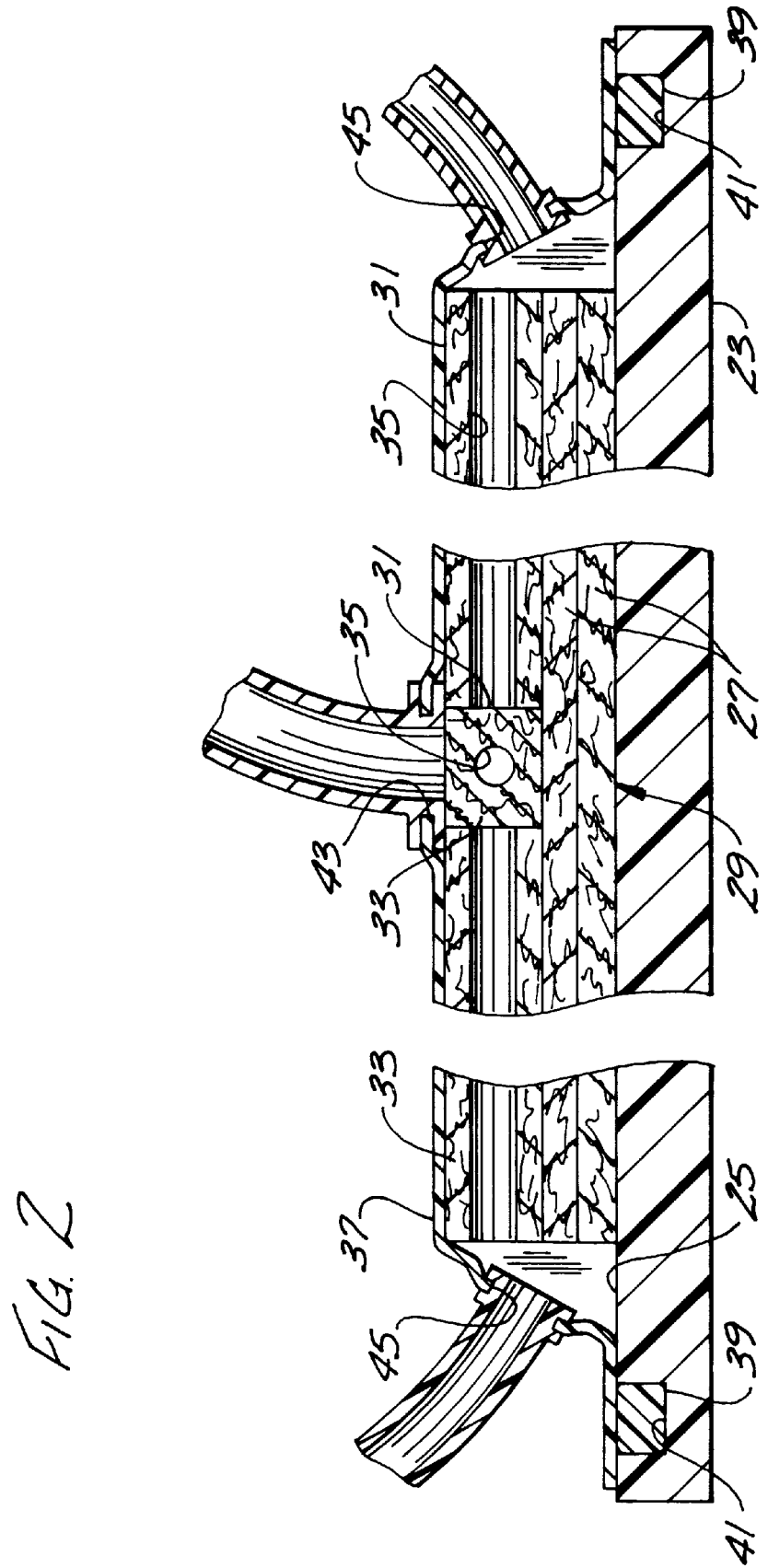
FIG. 2 is a fragmentary section taken in the plane of line 2—2 of FIG. 1.

One or more layers of dry, fibrous, resin absorbing lay up material 27 (two layers of which are shown in FIGS. 2 and 3) overlay the mold surface 25 within the edge margins of the mold 23 to define a fiber construction, generally indicated as 29, for reinforcing the composite structure. The lay up material 27 is preferably a conventional woven or felted fiber glass and is sufficiently flexible so that the fiber construction conforms to the shape of the mold surface 25. It is also contemplated that materials such as carbon, graphite cloth or other suitable fibrous materials may be used instead of fiber glass without departing from the scope of this invention.

Still referring to FIG. 1, elongate stiffeners (broadly, "distribution members"), indicated generally at 31, overlay the fiber construction 29 in a desired pattern. The stiffeners 31 are generally tubular, having an outer wall 33 and an internal channel 35 extending longitudinally within the outer wall substantially the entire length of the stiffener. The outer wall 33 of each stiffener is constructed of a dry, resin absorptive fibrous material, such as a fiber glass material. The fiber glass may be in the form of chopped fibers or formed as a continuous fiber mat. For reasons which will be described later, the fibrous material of the outer wall 33 is preferably compatible with the fibrous lay up material 27 of the fiber construction 29. The stiffeners 31 are sufficiently porous to permit resin to diffuse through the outer wall 33 into the internal channel 35, and to pass outward from the channel through the outer wall for distribution into the fiber construction 29. It is also contemplated that the stiffeners 31 may be constructed of fibrous materials other than fiber glass and remain within the scope of this invention, as long as the material is capable of absorbing resin, provides sufficient porosity to permit resin to diffuse through the outer wall 33, and is compatible with the fibrous lay up material 27 of the fiber construction 29.

Figure 4:
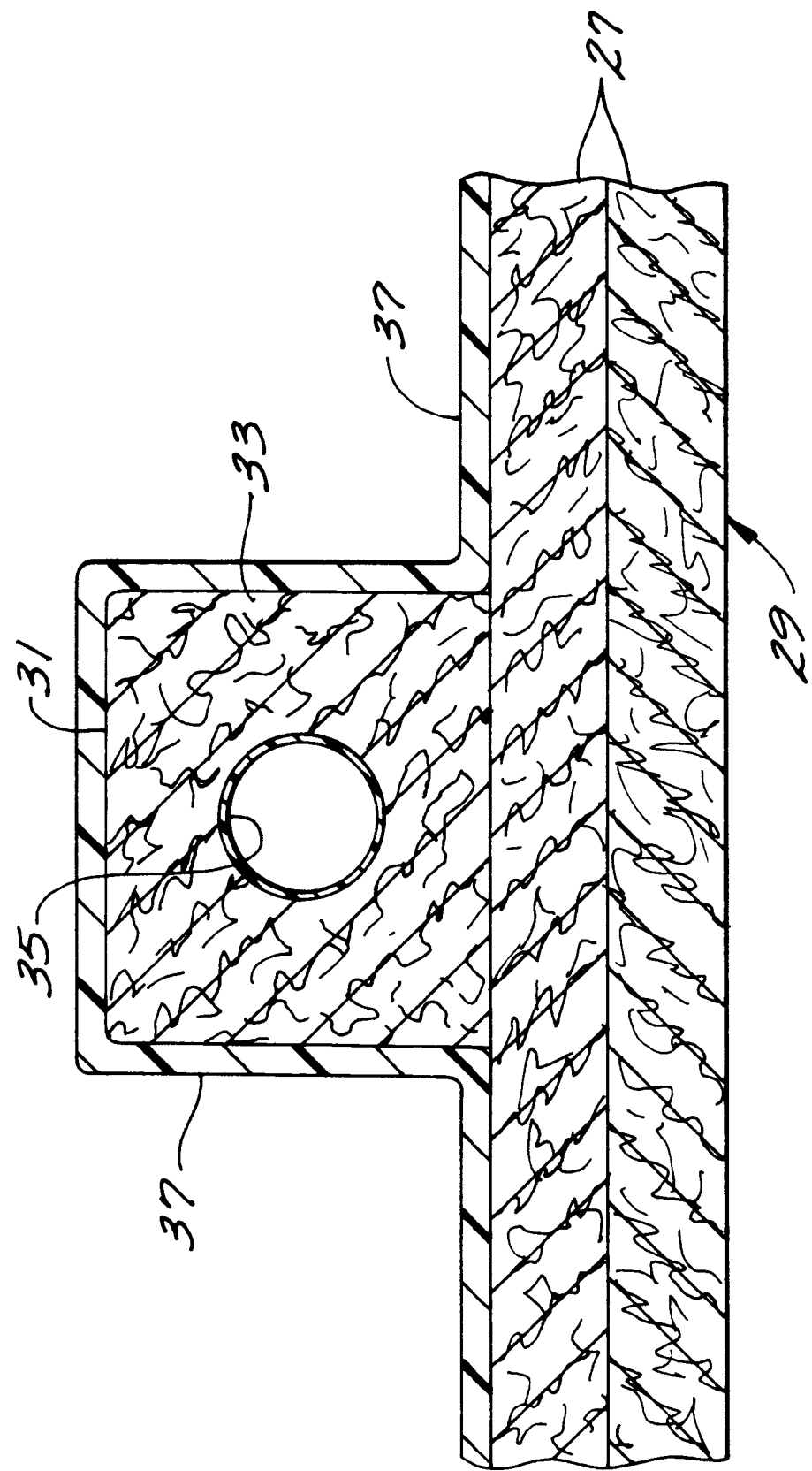
FIG. 4 is an enlarged fragmentary of FIG. 3.

As shown in FIG. 4, the outer walls 33 of the stiffeners 31 are square in cross-section so that the entire surface area of one side of each stiffener lies in contact with the fiber construction 29. However, the cross-sectional shape of the outer wall 33 of each stiffener 31 may be circular (e.g. the stiffener is cylindrical), triangular, trapezoidal or other suitable shape depending on the desired stiffness of the stiffener. The cross-sectional dimensions of the stiffeners 31 will vary with the size, shape and degree of stiffness, or rigidity, of the composite structure to be formed by the vacuum bag molding process. As an example, an apparatus for forming a boat hull, such as the apparatus shown in FIG. 5, may use stiffeners 31 that are 1 square inch in cross-section (e.g. 1 inch wide by 1 inch high) and spaced apart about 1–3 feet. Generally, stiffeners 31 of larger dimensions will be used as the size of the structure increases.

The internal channels 35 of the stiffeners 31 are generally cylindrical and are sufficiently sized to provide low resistance against the flow of resin longitudinally through the stiffeners (i.e. the resin flows substantially freely through the stiffeners) after the resin diffuses through the outer wall 33 and into the internal channel. The size of the channels 35 will vary depending on the cross-sectional dimensions of the stiffeners 31. For example, the internal channel 35 of a stiffener 31 having a 1 square inch cross-sectional area is preferably in the range of one-eighth to one-quarter inch in diameter.

The stiffeners 31 are preferably molded in a two-piece mold (not shown) in which the mold pieces are separable for removing the stiffeners from the mold. A rod (not shown) having a diameter substantially smaller than the cross-sectional dimension of the stiffener mold extends longitudinally through the mold in spaced relationship from the inner surface of the mold to define a gap between the rod and the inner surface of the mold. The inner surface of the stiffener mold is sized and shaped according to the desired size and cross-sectional shape of the outer wall 33 of the stiffener 31, and the diameter of the rod is sized according to the desired diameter of the internal channel 35. The dry fibrous material of the stiffener 31 is loaded into the stiffener mold in the gap between the rod and the inner surface of the mold. A suitable binder, such as a resin or an epoxy, is poured into the mold to slightly wet the fibrous material (e.g. to saturate the fibers to about 5% of full saturation), so that the fibrous material remains substantially dry and porous but sufficiently compacted to define the shape of the stiffener.

Upon curing of the binder, the dry fibrous material and binder define the outer wall 33 of the stiffener 31. The rod is removed to define the internal channel 35 within the outer wall 33 of the stiffener 31 and the two-piece mold is taken apart for removing the stiffener from the mold. While the stiffener forming process described is for forming a single stiffener 31, it is to be understood that the stiffener mold may be constructed for forming a network of interconnected stiffeners. It is also contemplated to be within the scope of the present invention that monofilaments may be used to hold the shape of the stiffener so that no binder is required, or that the stiffeners may be constructed by braiding fiber tows to provide the flexibility of the stiffener and permit the central channel to be kept at about one atmosphere vacuum pressure.

The stiffeners 31 are preferably arranged on the fiber construction 29 in a grid formation to define a continuous network of stiffeners. For example, in the illustrated embodiment shown in FIG. 1, one stiffener 31 extends longitudinally the length of the fiber construction 29 and additional stiffeners extend laterally across the width of the fiber construction generally to the edge margins of the mold 23, intersecting the longitudinally extending stiffener. As shown in FIG. 2, at the intersection of two stiffeners 31, the first stiffener is cut and placed on both sides of the second stiffener. It is not necessary to the present invention that the channels 35 of intersecting stiffeners 31 be in open fluid communication with each other. However, it is contemplated that the stiffeners 31 may overlay each other or may be weaved together without departing from the scope of this invention. Stiffener arrangements other than grid-like patterns may also be used, such as a series of longitudinally extending stiffeners 31 (or laterally extending stiffeners) in parallel, spaced apart relationship. The number of stiffeners 31 and their relative spacing will vary with the desired size, design and degree of stiffness of the composite structure being fabricated. Typically, for a larger structure, more stiffeners 31 will be used to ensure that the flow of resin through the mold is generally uniform and unimpeded, and to ensure that a structure of high stiffness is formed.

A vacuum bag 37 constructed of a flexible, fluid impervious material overlays the fiber construction 29 and stiffeners 31. The vacuum bag 37 has a peripherally extending rubber seal 39 sized for sealing engagement with the mold 23 in a slot 41 extending along the peripheral edge margins of the mold so that the mold surface 25 and vacuum bag 37 define a sealed enclosure for the fiber construction 29 and stiffeners 31. The tight fit of the seal 39 within the slot 41 of the mold 23 secures the vacuum bag 37 over the fiber construction 29 and stiffeners 31. Alternatively, the vacuum bag 37 may be secured to the mold 23 by other methods, such as by using suitable vacuum tape (not shown) to tape the vacuum bag to the peripheral edge margins of the mold. The vacuum bag 37 has a resin inlet 43 communicating with the interior of the enclosure to permit resin to be injected into the enclosure for wetting the fiber construction 29 and stiffeners 31. Depending on the size and surface area of the composite structure being fabricated, more than one resin inlet 43 may be provided.

Vacuum outlets 45 in the vacuum bag 37 communicate with the interior of the enclosure to permit air to be pumped out of the enclosure. Alternatively, the vacuum outlets 45 may extend through the mold 23 to communicate with the interior of the enclosure. The vacuum outlets 45 are connected by suitable hosing 47 to a pump (not shown) for pumping the air from the enclosure to draw a vacuum on the enclosure. It is also contemplated that a groove, such as that shown in FIG. 5 and indicated as 49, may extend about the periphery of the mold 23 in communication with the vacuum outlets 45 to facilitate a uniform distribution of the vacuum pressure within the enclosure.

In operation, a coating of mold release material (not shown), such as silicone or TEFLON emulsion, is applied to the mold surface 25 to facilitate removal of the composite structure from the mold 23 after fabrication. The fiber construction 29 is laid loosely on the mold surface 25, covering the entire mold surface interior of the edge margins of the mold 23. The stiffeners 31 are arranged loosely on the fiber construction 29 in the desired stiffener arrangement. The vacuum bag 37 is placed over the fiber construction 29 and stiffeners 31 and the seal 39 on the vacuum bag is pressed down into the slot 41 in the mold 23 to secure the bag to the mold, thereby forming the sealed enclosure. The pump is connected to the vacuum outlets 45 via the hosing 47 and operated to draw air out of the enclosure, thus creating a vacuum in the enclosure. As air is drawn from the enclosure, the flexible vacuum bag 37 collapses and conforms to the shape of the fiber construction 29 and stiffeners 31 within the enclosure. The vacuum bag 37 is drawn tight against the fiber construction 29 and stiffeners 31 so that the fiber construction is compacted and held in place against the mold surface 25, with the stiffeners spacing the bag from the fiber construction around the outer wall of the stiffeners.

The source of resin is then connected to the resin inlet 43 of the vacuum bag 37 and resin infuses into the sealed enclosure between the bag and the fiber construction 29 and stiffeners 31. The vacuum pressure in the enclosure draws the resin generally outward toward the edge margins of the mold 23. As resin flows into contact with the stiffeners 31, it diffuses (e.g. permeates) through the porous outer walls 33 of the stiffeners and into the interior channels 35 of the stiffeners. Because the open channels 35 provide a path of least resistance for the resin, the resin flows generally freely through the channels to quickly distribute the resin to the outer ends of the stiffeners 31 adjacent the portions of the fiber construction 29 remote from the resin inlet 43, and in particular the fiber construction at the edge margins of the mold 23. As resin flows through the channels 35, the resin passes out of the channels through the outer walls 33 of the stiffeners 31 and into the fiber construction 29. After the fiber construction 29 is fully saturated, additional resin remains in and fills the internal channels 35 and the outer walls 33 of the stiffeners are fully saturated with the resin. While maintaining the vacuum on the sealed enclosure, the resin is then allowed to cure or solidify. Because the stiffeners 31 are constructed of a material that is compatible with the lay up material 27 of the fiber construction 29, the stiffeners are integrated with the fiber construction upon curing of the resin to form a unitary, composite structure having integral stiffeners. After curing, the pump is turned off and the vacuum bag 37 is removed from the mold 23 and either discarded or washed for subsequent use. The composite structure is then removed from the mold 23.

In view of the above, it will be seen that the several objects of the invention are achieved and other advantageous results attained. Providing the tubular stiffeners 31 having internal channels 35 substantially reduces the resin flow resistance encountered upon injection of the resin into the enclosure formed by the vacuum bag 37 and the mold surface 25. For example, it has been observed that resistance to resin flow through the tubular stiffeners 31 of the apparatus of the present invention is reduced by about 1000 times (as measured by standards known to those skilled in the art) in comparison to the flow resistance encountered when using conventional vacuum bag apparatus. As a result, the stiffeners 31 eliminate the need for an operator to spend up to several hours manually applying pressure to the vacuum bag 37 to speed the distribution of resin to the outer periphery of the mold 23. The faster rate of resin distribution also promotes a more complete and evenly distributed wetting of the fiber construction 29 before the resin begins to cure, improving the structural integrity of the composite without the process delays associated with conventional apparatus and processes.

In addition to providing channels 35 for the uniform distribution of resin throughout the fiber construction 29, constructing the stiffeners 31 of resin absorbing material permits the stiffeners to become saturated and integrated with the fiber construction upon curing of the resin. Integration of these stiffeners 31 significantly increases the rigidity, or stiffness, of the final composite structure, as determined by methods standard to the art. For example, FIG. 6 illustrates the results of a conventional bending test in which a concentrated load was applied centrally to composite structures spanning two supports. The test was performed on a testing machine manufactured by MTS Systems Corporation and designated Model 244.31. The deflection of the composite structure fabricated according to the apparatus and process of the present invention was substantially less (i.e. substantially more rigid) than the deflection of composite structures fabricated using prior art vacuum bag molding apparatus.

Moreover, composite structures fabricated according to the apparatus and process of the present invention are lighter in weight than composite structures formed using conventional vacuum bag molding apparatus and conventional hand lay up techniques. Because the material of the stiffeners 31 is sufficiently compatible with the lay up material 27 of the fiber construction 29 to permit integration of the stiffener with the fiber construction upon curing of the resin, no covering layer of lay up material is required and at least one less layer of lay up material is needed to form the fiber construction. FIG. 7 illustrates the weight of composite structures formed using two layers of lay up material 27 along with a network of stiffeners 31 according to the present invention, in comparison with the weight of composite structures formed using prior art molding apparatus and hand lay up techniques in which three layers of lay up material are used. The composite structures formed using the tubular stiffeners 31 were substantially lighter (and stiffer as discussed above) than the three layer structures formed using conventional apparatus.

While the invention is susceptible to various modifications and alternative forms, specific embodiments thereof have been shown by way of example and were herein described in detail. It should be understood, however, that it is not intended to limit the invention to the particular form disclosed, but on the contrary, the intention is to cover all modifications, equivalents and alternatives falling within the spirit and scope of the invention as defined by the appended claims.

What is claimed is:

1. An apparatus for use in the production of fiber reinforced polymer composite structures, the apparatus comprising:
   a mold having a mold surface,
   a fiber construction on the mold surface comprising at least one layer of dry resin absorbing fibrous lay up material,
   a stiffener on the fiber construction, the stiffener being generally constructed of a dry resin absorbing material,
   a flexible, resin impervious vacuum bag over the mold surface, the vacuum bag being marginally sealed to the mold surface to define an enclosure, the fiber construction and stiffener being generally within the enclosure, the vacuum bag having a resin inlet to permit introduction of a resin into the enclosure, and means for drawing a vacuum upon the enclosure to draw the vacuum bag against the fiber construction and stiffener, the stiffener spacing the vacuum bag from the fiber construction to facilitate the distribution of resin uniformly throughout the fiber construction when the vacuum bag is drawn against the fiber construction and stiffener, the stiffener being integrated with the fiber construction upon curing of the resin.

2. Apparatus as set forth in claim 1 wherein the stiffener is generally tubular and has an outer wall and an internal channel extending longitudinally within the outer wall, the outer wall of the stiffener being sufficiently permeable to permit resin to permeate through the outer wall of the stiffener into the channel whereby resin flows generally freely through the channel to facilitate uniform distribution of the resin to the fiber construction.

3. Apparatus as set forth in claim 2 wherein the internal channel of the stiffener is generally square.

4. Apparatus as set forth in claim 3 wherein the outer wall of the stiffener is generally cylindrical.

5. Apparatus as set forth in claim 2 wherein the stiffener is constructed of a fibrous material.

6. Apparatus as set forth in claim 2 further comprising a plurality of said stiffeners arranged on the fiber construction to increase the rate of distribution of resin to the fiber construction.

7. Apparatus as set forth in claim 6 wherein the stiffeners are arranged in a generally grid formation.

8. An apparatus for use in the production of fiber reinforced polymer composite structures, the apparatus comprising:

a mold having a mold surface, a fiber construction on the mold surface comprising at least one layer of dry resin absorbing fibrous lay up material, a generally tubular distribution member on the fiber construction, the distribution member having an outer wall and an internal channel extending longitudinally within the outer wall, the internal channel being fully enclosed about its periphery by the outer wall, the outer wall of the distribution member being generally constructed of a dry resin absorbing material and being sufficiently permeable to permit infusion of resin into the channel whereby the resin flows substantially freely through the channel for quick, uniform distribution of the resin to the fiber construction, a flexible, resin impervious vacuum bag over the mold surface, the vacuum bag being marginally sealed to the mold surface to define an enclosure, the fiber construction and distribution member being generally within the enclosure, the vacuum bag having a resin inlet to permit introduction of a resin into the enclosure, and means for drawing a vacuum upon the enclosure to draw the vacuum bag against the fiber construction, the distribution member spacing the vacuum bag from the fiber construction to facilitate the uniform distribution of resin to the fiber construction when the vacuum bag is drawn against the fiber construction and distribution member.

9. A process for producing a fiber reinforced polymer composite structure comprising the steps of:

placing a fiber construction comprising at least one layer of dry resin absorbing fibrous lay up material on a mold surface, placing a stiffener on the fiber construction, the stiffener being generally constructed of a dry resin absorbing material, marginally sealing a flexible, resin impervious vacuum bag to the mold surface to form an enclosure for the stiffener and the fiber construction, drawing a vacuum upon the enclosure to draw the vacuum bag generally against the fiber construction and stiffener, injecting resin into the enclosure through a resin inlet in the vacuum bag to impregnate the stiffener and the fiber construction with resin, the stiffener spacing the vacuum bag from the fiber construction to facilitate the distribution of resin to the fiber construction, and curing the resin to integrate the stiffener with the fiber construction to form the composite structure.

10. The process set forth in claim 9 wherein the stiffener is generally tubular and has an outer wall and an internal channel extending longitudinally within the outer wall, the outer wall of the stiffener being sufficiently permeable to permit resin to permeate through the outer wall of the stiffener into the internal channel whereby resin flows generally freely through the channel to facilitate the distribution of resin to the fiber construction.

11. The process set forth in claim 10 further comprising the step of arranging a plurality of the stiffeners on the fiber construction to increase the distribution rate and uniformity of resin distributed to the fiber construction.

* * * * *